United States Patent
Matsumoto et al.

(10) Patent No.: US 7,922,338 B2
(45) Date of Patent: Apr. 12, 2011

(54) ILLUMINATION DEVICE AND PROJECTION DISPLAY DEVICE

(75) Inventors: Shinya Matsumoto, Hirakata (JP); Takashi Ikeda, Higashi-Osaka (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 336 days.

(21) Appl. No.: 12/181,508

(22) Filed: Jul. 29, 2008

(65) Prior Publication Data
US 2009/0040753 A1 Feb. 12, 2009

(30) Foreign Application Priority Data
Aug. 10, 2007 (JP) .................. 2007-209643

(51) Int. Cl.
*G03B 21/14* (2006.01)
(52) U.S. Cl. ............. 353/87; 353/85; 362/227; 362/239
(58) Field of Classification Search .............. 353/38, 353/85, 87; 362/227, 232, 239, 249.07, 259, 362/277
See application file for complete search history.

(56) References Cited

U.S. PATENT DOCUMENTS
2005/0237493 A1* 10/2005 Tajiri ........................ 353/85

FOREIGN PATENT DOCUMENTS
JP 2005-331906 A 12/2005
WO 99/49358 A1 9/1999

* cited by examiner

*Primary Examiner* — Kevin Pyo
(74) *Attorney, Agent, or Firm* — Marvin A. Motsenbocker; Mots Law, PLLC

(57) ABSTRACT

An illumination device comprises: a plurality of laser light sources arranged so as to be identical in a direction of light emission; an optical element for converting laser light emitted from the laser light sources into parallel light at least in one direction; and a fly-eye lens into which the laser light converted into parallel light is entered. Placement of the laser light sources is adjusted in such a manner that incident regions of the laser light on the fly-eye lens are mutually shifted in a row or column direction of lens cells disposed in the fly-eye lens.

6 Claims, 14 Drawing Sheets

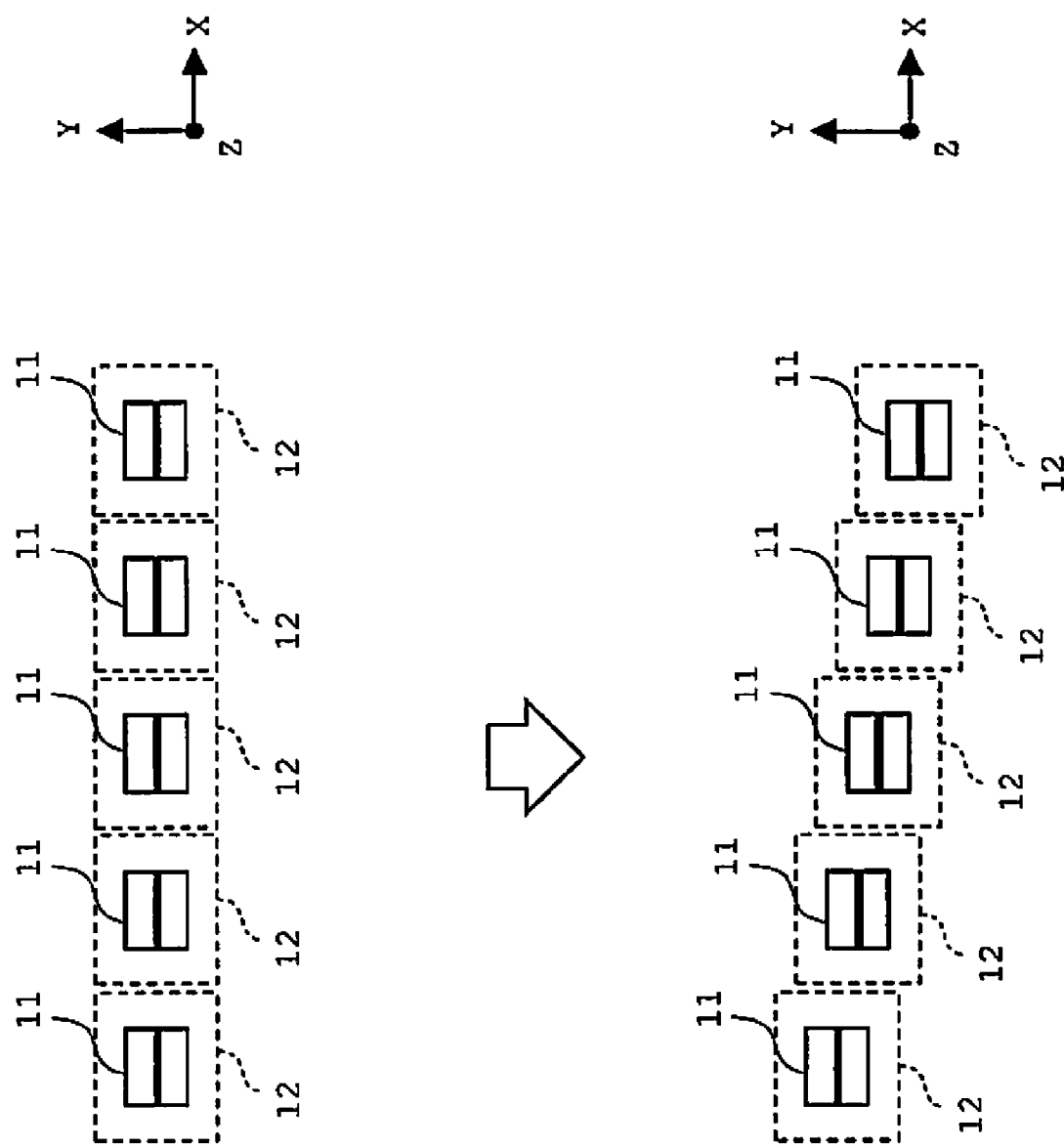

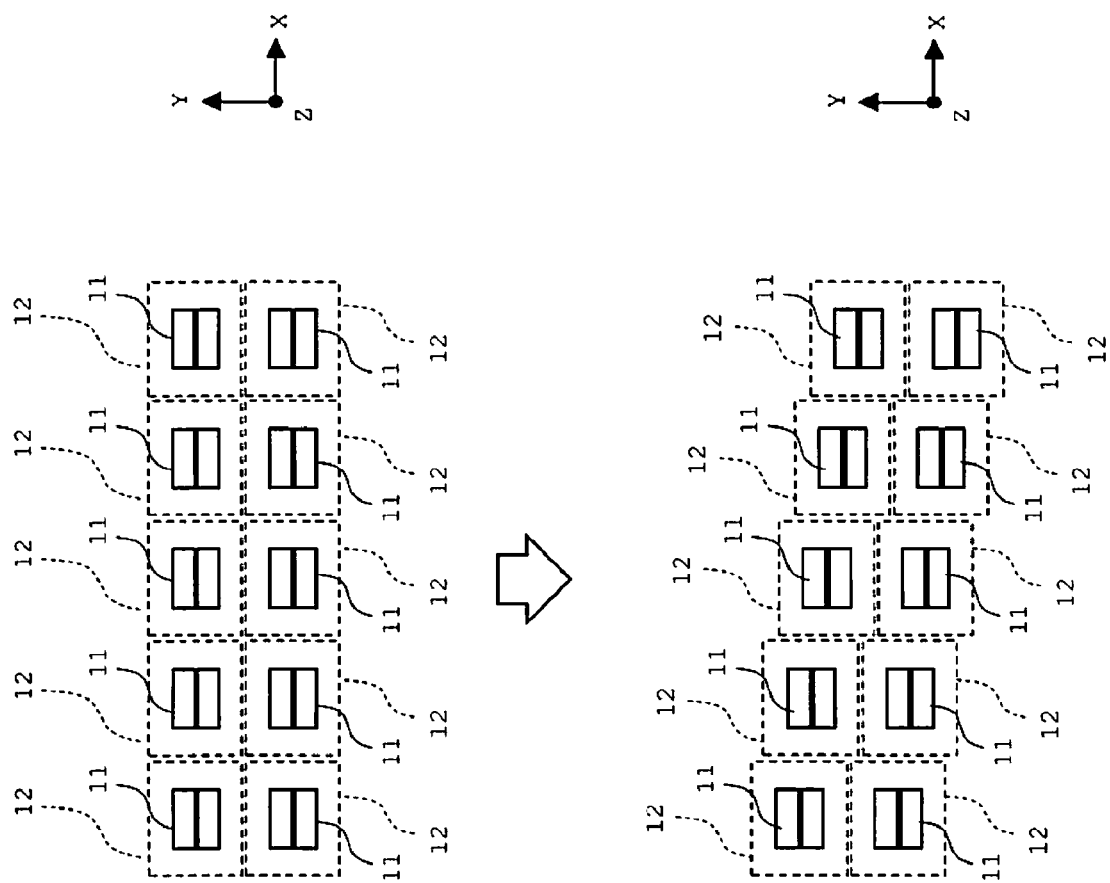

VARIABLE s = 5

VARIABLE s = 1

ILLUMINATION DEVICE AND PROJECTION DISPLAY DEVICE

This application claims priority under 35 U.S.C. Section 119 of Japanese Patent Application No. 2007-209643 filed Aug. 10, 2007, entitled "ILLUMINATION DEVICE AND PROJECTION DISPLAY DEVICE".

BACKGROUND OF THE INVENTION

1. Technical Field of the Invention

The present invention relates to an illumination device and a projection display device using the same, and more particularly, is suitable for use with a laser light source as an emission light source.

2. Disclosure of the Related Art

Conventionally, in a projection display device (hereinafter, referred to as a "projector"), there has been used a lamp light source such as an ultra-high pressure mercury lamp, a metal halide lamp, or a xenon lamp, as an emission light source. Also, in recent years, a projector incorporated with a solid-state light source such as a semiconductor laser, as an emission light source, has been developed. The laser light source has been noticed as an emission light source for a next-generation projector, in view of a point that the laser light source has a superior performance of rendering a wide color space with high luminance and high precision. In addition, an optical system using a fly-eye lens is widely used as an illumination device of a projector.

In the case where a laser light source operable to emit a light flux having a large solid angle is used as an emission light source, it is necessary to properly convert laser light emitted from the laser light source into parallel light and enter the light into a fly-eye lens. In converting laser light into parallel light by using a lens, a diffraction grating, or the like, an intensity distribution of laser light to be obtained after transmission through the lens, the diffraction grating, or the like may become non-uniform.

FIG. 14B is a diagram schematically showing in monochromatic expression an intensity distribution of a flux of laser light emitted from a laser light source which is converged and converted into parallel light by a cylindrical lens in an Y-axis direction as shown in FIG. 14A, the intensity distribution being determined by the use of an optical simulation software program. In the diagram, the light intensity is higher with increasing proximity to white. In this arrangement, the light intensity distribution is non-uniform in the Y-axis direction.

This phenomenon also takes place when a plurality of laser light sources are arranged in an array. FIG. 14D is a diagram schematically showing in monochromatic expression a light intensity distribution obtained by arranging five laser light sources in an X-axis direction, converging and converting laser light from the laser light sources into parallel light equally in the Y-axis direction by a horizontally long cylindrical lens as shown in FIG. 14C, the light intensity distribution being determined by the use of an optical simulation software program. As in the case with FIG. 14B, the light intensity is higher with increasing proximity to white. Here, light intensity is approximately uniform in the X-axis direction but is non-uniform in the Y-axis direction.

If a normal fly-eye lens is used to superimpose light of non-uniform intensity as above, the number of patterns of light superimposition is decreased. Accordingly, illuminance non-uniformity occurs on an imager (such as a liquid crystal panel), which leads to unevenness of an image projected onto a screen.

Illuminance non-uniformity can be suppressed by narrowing a cell pitch of the fly-eye lens to increase the number of light superimpositions. However, decreasing a cell pitch may raise the rate at which light is attenuated due to a shear droop between cells at the time of lens formation, resulting in reduced light use efficiency. In addition, with a narrow cell pitch, illuminance non-uniformity may occur in illumination light due to other factors such as interference fringes.

SUMMARY OF THE INVENTION

A primary object of the present invention is to suppress illuminance non-uniformity in illumination light on an imager in a smooth and effective manner.

A first aspect of the present invention relates to an illumination device. An illumination device in the first aspect includes: a plurality of laser light sources arranged so as to be identical in a direction of light emission; an optical element for converting laser light emitted from the laser light sources into parallel light at least in one direction; and a fly-eye lens into which the laser light converted into parallel light is entered. In addition, placement of the laser light sources is adjusted in such a manner that incident regions of the laser light on the fly-eye lens are mutually shifted in a row or column direction of lens cells disposed in the fly-eye lens.

In the illumination device according to the first aspect, the plurality of laser light sources may be arranged in a row, or in two or three dimensions. Incidentally, "arranging in two dimensions" means to arranging laser light sources in two or more lines in which luminous points of the laser light sources are positioned in one plane perpendicular to laser light axes, and "arranging in three dimensions" means arranging laser light sources in two or more lines in which some or all of luminous points of the laser light sources are mutually shifted in the direction of the laser light axes.

Arranging the laser light sources in two dimensions produces illumination light of high brightness. Meanwhile, arranging the laser light sources in three dimensions allows adjacent laser light sources to be partly overlapped in an in-plane direction of a plane perpendicular to laser light axes, thereby shortening a distance between the laser light axes. As a result, it is possible to reduce illumination light in size and control an Etendue value of illumination light. That is, it is possible to increase an amount of light captured into an imager and improve light use efficiency.

In the present invention, an optical element may be configured as to include at least one cylindrical lens or diffraction element.

A second aspect of the present invention relates to a projection display device. A projection display device in the second aspect has an illumination device for applying light to a region to be illuminated and an imager disposed in the region to be illuminated. The illumination device is of the same structure as that of the illumination device of the first aspect.

BRIEF DESCRIPTION OF THE DRAWINGS

These and other objects, and novel features of the present invention will become more apparent upon reading the following detailed description along with the accompanying drawings

FIGS. 2A and 2B are diagrams showing a condition for a simulation example 1 in the embodiment;

FIGS. 6A and 6B are diagrams showing a condition for a simulation example 2 in the embodiment;

The drawings are provided mainly for describing the present invention, and do not restrict the scope of the present invention.

DESCRIPTION OF PREFERRED EMBODIMENTS

Preferred embodiments of the present invention will now be described with reference to the drawings.

Figure 1A:
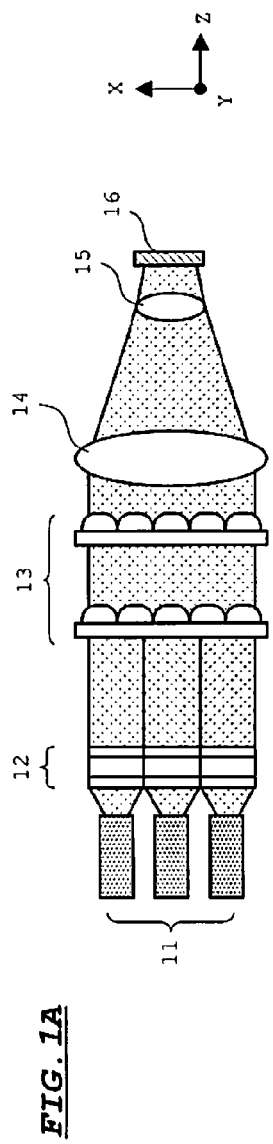
FIG. 1A shows a basic configuration of an optical system in an embodiment.

FIG. 1A illustrates a basic configuration of an optical system in an embodiment. In FIG. 1A, reference numeral 11 denotes a laser light source (semiconductor laser). This embodiment has three laser light sources 11. These laser light sources 11 are arranged in such a manner that luminous points thereof are positioned in an X-Y plane and a long axis of an emitted beam is in parallel to a Y axis.

Laser light emitted from the laser light sources 11 is converged and converted into parallel light in a Y-axis direction by corresponding cylindrical lenses 12. The laser light converted into parallel light is entered into a pair of fly-eye lenses 13. The fly-eye lenses 13 have each lens cells arranged in matrix. After passing through the lens cells, the laser light goes through condenser lenses 14 and 15, and then is superimposed on an incident plane of a liquid crystal panel (imager) 16.

Figure 1B:
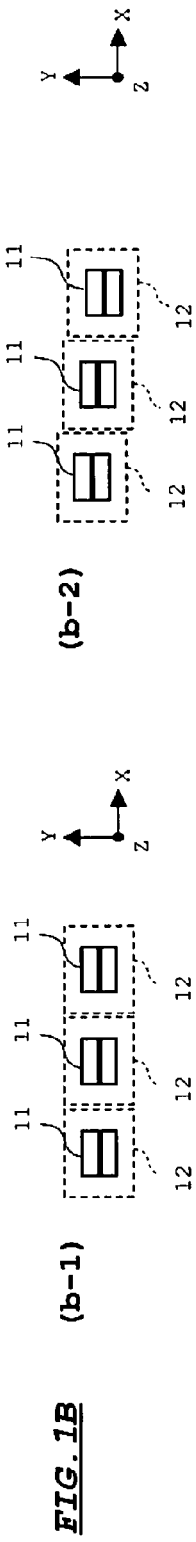
FIG. 1B shows placement of laser light sources.
Figure 1C:
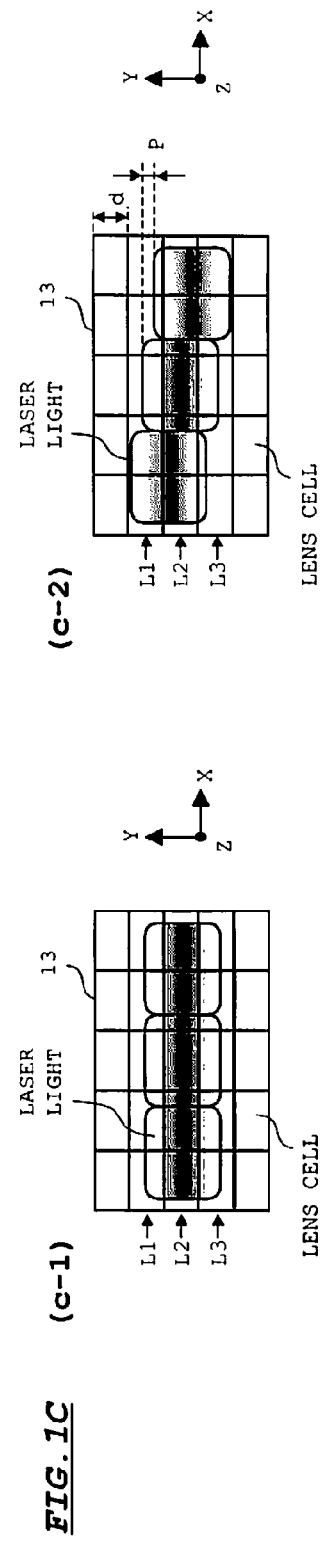
FIG. 1C shows incident states of laser light on a fly-eye lens, and FIG. 1D schematically shows generation states of illuminance non-uniformity in illumination light on an imager.

In this configuration, when the laser light sources 11 and the cylindrical lenses 12 are linearly arranged in an X-axis direction as shown in FIG. 1B (b-1), an intensity distribution of laser light incident on the fly-eye lens 13 is as shown in FIG. 1C (c-1). In the diagram, the intensity of the laser light is lower with increasing proximity to black. That is, the intensity distribution of the laser light is approximately uniform in the X-axis direction and varies in the Y-axis direction. The intensity of the laser light is low at a central position in the Y-axis direction, and is high at an end distant from the central position in the Y-axis direction.

In this case, laser light is entered in an almost identical intensity pattern into the lens cells in a line L1 of the fly-eye lens 13. Similarly, laser light is entered in an almost identical pattern into the lens cells in lines L2 and L3. Therefore, the number of patterns of laser light superimposition by the lens cells is equal to the number of lines (L1, L2 and L3) of lens cells into which the laser light is entered, i.e. three patterns.

Figure 1D:
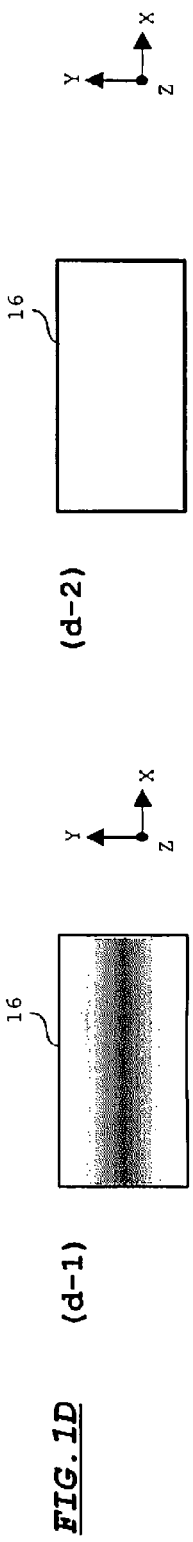

Here, laser light is entered into the lens cells in the line L2, with a distribution of light intensity which is approximately uniform in the X-axis direction and varies in the Y-axis direction. The laser light with the intensity distribution is then equally superimposed by the lens cells in the line L2 on the incident plane of the liquid crystal panel 16. Thus, the intensity distribution of illumination light on the liquid crystal panel 16 has an intensity distribution in which the intensity varies in the Y-axis direction as shown in FIG. 1D (d-1), under the influence of the intensity distribution of the laser light from the lens cells in the line L2. The intensity of the illumination light here is lower with increasing proximity to black. Therefore, the illumination light has an intensity distribution in which a central belt-like zone thereof represents a low intensity in the Y-axis direction. As above, illuminance non-uniformity occurs in illumination light on the incident plane of the liquid crystal panel 16. This illuminance non-uniformity results in unevenness of an image projected onto a screen (hereinafter referred to as "projected image").

In this embodiment, the laser light sources 11 and the corresponding cylindrical lenses 12 are mutually shifted in the Y-axis direction, as shown in FIG. 1B (b-2). Arranging the laser light sources 11 and the cylindrical lenses 12 in this manner allows laser light incident on the fly-eye lens 13 to be mutually shifted in the Y-axis direction, as shown in FIG. 1C (c-2).

In this case, the intensity distribution of the laser light entered into the lens cells in the lines L1, L2 and L3 is not uniform in the cells of the same line like the case in FIG. 1C (c-1), but varies mutually among all the cell lenses. Thus, the number of patterns of laser light superimposition by these lens cells is equal to the number of lens cells into which the laser light is entered. In FIG. 1C (c-2), the laser light is entered into 15 lens cells of different intensity distributions. Accordingly, the number of superimposition patterns is here 15.

As above, in this embodiment, the laser light sources 11 and the cylindrical lenses 12 are shifted in the Y-axis direction to significantly increase the number of patterns of laser light superimposition on the incident plane of the liquid crystal panel 16, as compared with the case where the laser light sources 11 and the cylindrical lens 12 are arranged as shown in FIG. 1B (b-1). As a result, it is possible to improve prominently the effect of the fly-eye lens 13 in uniformizing illumination light as shown in FIG. 1D (d-3).

It is expected that the effect of uniformizing illumination light depends on a change in a shift amount P between laser lights shown in FIG. 1C (c-2). That is, as the shift amount P changes, the intensity distribution of the laser light with respect to the lens cells varies, thereby bringing about a change in the state of superimposition of light incident on the liquid crystal panel 16. This may generate variations in the effect of uniformizing illumination light.

Description will be given below as to simulation examples for the effect of uniformizing illumination light in this embodiment. Here, the shift amounts P between laser lights were changed in accordance with an equation shown below, and the effect of uniformizing illumination light was simulated with each of the shift amounts P.

$$P = d/s \quad (1)$$

In the above equation, d denotes a length of a lens cell along the Y axis direction, as shown in FIG. 1C (c-2), and s denotes a variable for setting the shift amount P (natural number of 1 or more). That is, in the following simulation examples, the length of the lens cell along the Y axis direction was divided into some equal parts, and one of the divided parts was set as shift amount P. It is here assumed that adjacent laser lights are all shifted by the shift amount P in the same direction.

SIMULATION EXAMPLE 1

Figures 3A, 3B:
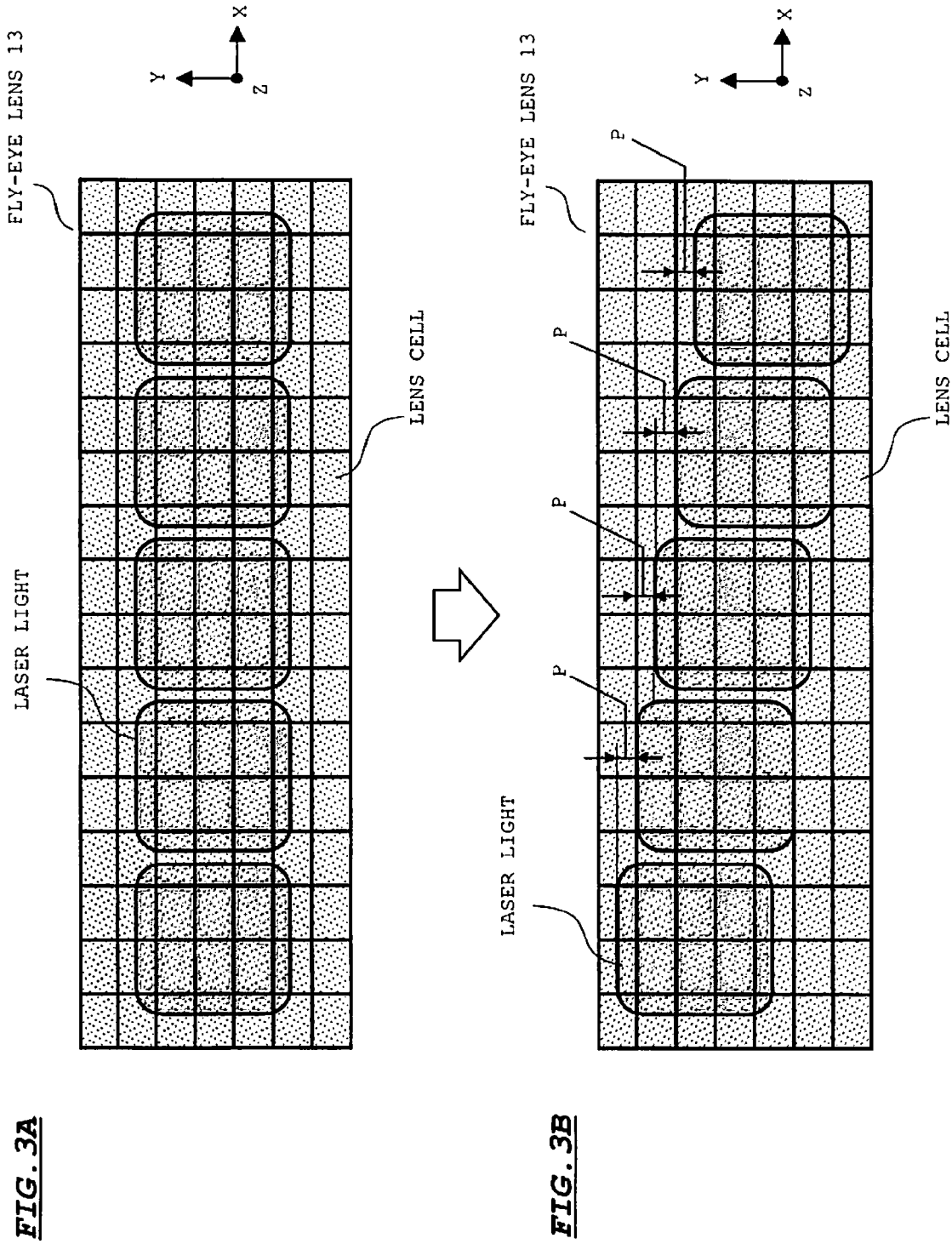
FIGS. 3A and 3B are diagrams showing a condition for the simulation example 1 in the embodiment.

This simulation was carried out with five pairs of the laser light sources 11 and the cylindrical lenses 12. The pairs of the laser light sources 11 and the cylindrical lenses 12 were linearly arranged as shown in FIG. 2A so that the incident state of laser light on the fly-eye lens 13 became as shown in FIG. 3A. Under this condition, the laser light source 11 and the cylindrical lens 12 in each of the pairs were shifted in order from the end in the Y-axis direction as shown in FIG. 2B, to thereby change the incident state of laser light on the fly-eye lens 13 as shown in FIG. 3B. Then, illuminance non-uniformity in illumination light with the shift of the laser light was determined by the use of an optical simulation software program. A basic configuration of the optical system is the same as that shown in FIG. 1A.

Figure 4B:
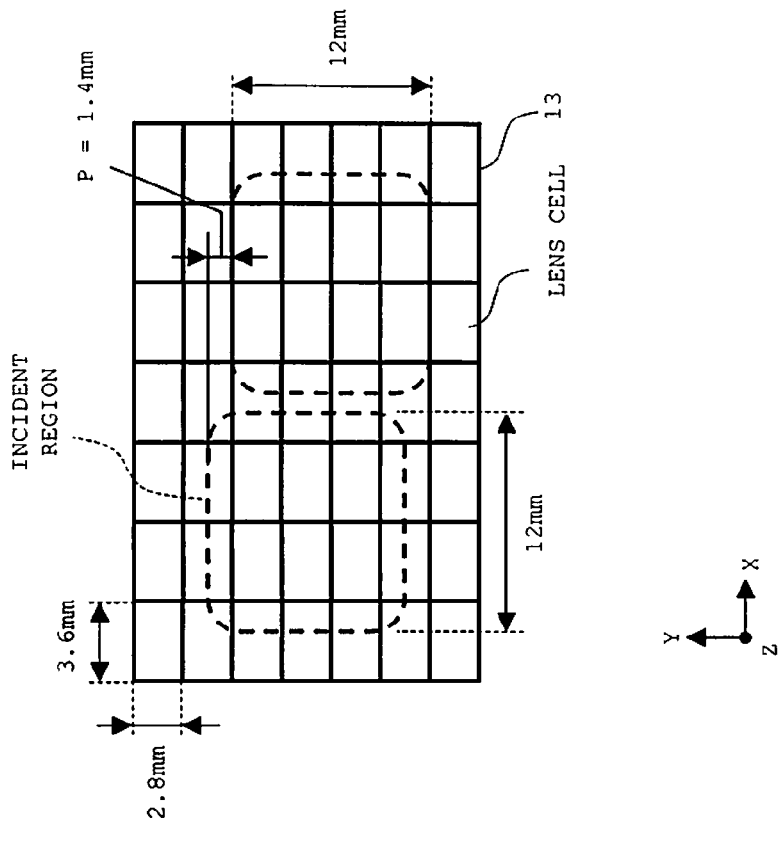
FIGS. 4A and 4B are diagrams showing a condition for the simulation example 1 in the embodiment.
Figure 4A:
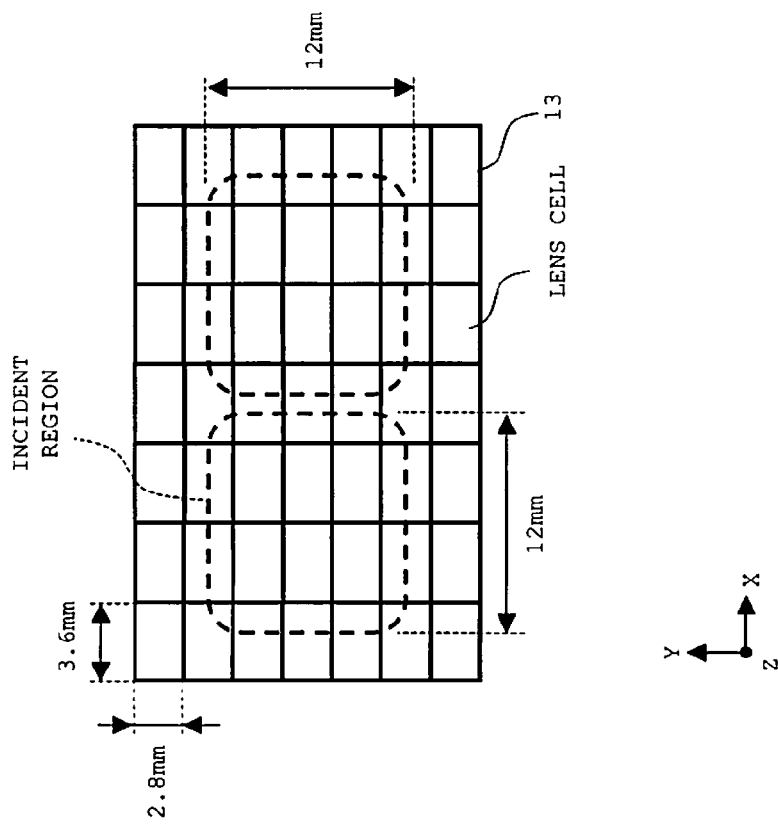

FIGS. 4A and 4B are diagrams showing relationships between an incident region of laser light and the fly-eye lens 13 in this simulation. FIG. 4A shows relationships between the incident region of laser light and the lens cells with no shift in the laser light (as shown in FIG. 3A), and FIG. 4B shows relationships between the incident region of laser light and the lens cells with a shift in the laser light (as shown in FIG. 3B). In FIG. 4B, the variable s in the foregoing equation (1) is set as s=2.

In this simulation, one lens cell is 2.8 mm long and 3.6 mm wide, and the incident region of laser light on the fly-eye lens 13 is about 12 mm long and about 12 mm wide. The shift amount P of laser light was set on the basis of the foregoing equation (1). In the case of FIG. 4B, that is, if the variable s is set at as s=2, the shift amount P of laser light is determined as follows:

$$P = 2.8 \text{ [mm]}/2 = 1.4 \text{ [mm]}.$$

Incidentally, divergent angles θx and θy of laser light in the X-axis and Y-axis directions were set as θx=20° and θx=80°.

Figure 5:
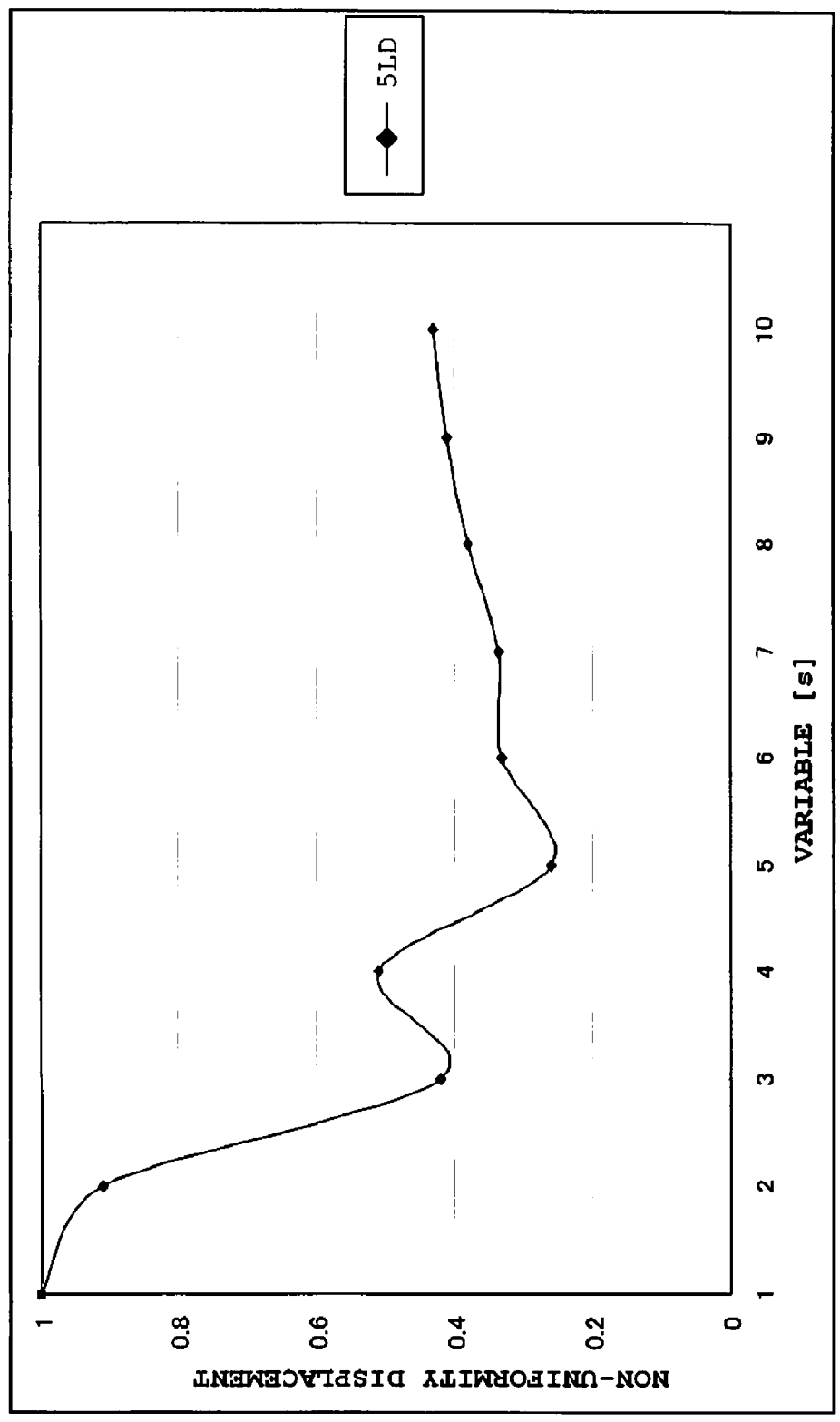
FIG. 5 is a graph showing a result of the simulation example 1 in the embodiment.

FIG. 5 shows a simulation result. A horizontal axis represents the variable s, and a vertical axis represents a displacement amount of illuminance non-uniformity. The displacement amount of illuminance non-uniformity was obtained by determining average illuminances on the liquid crystal panel 16 for a plurality of lines parallel to the X-axis direction (refer to FIG. 1A), and normalizing a difference between minimum and maximum values of the determined average illuminations, on the assumption that the difference with the variable s=1 is 1.

If the variable s=1, adjacent positions of application of laser light to the fly-eye lens 13 are displaced by one lens cell in the Y-axis direction from the state in FIG. 3A, and thus resulting illuminance non-uniformity is equivalent to that in the case with no shift in laser light as shown in FIG. 3A.

Referring to the simulation result in FIG. 5, it is understood that, as compared with the case of the variable s=1 (equivalent to the case with no shift in laser light), illuminance non-uniformity (displacement amount of non-uniformity) was not reduced so much with the variable s=2, but was significantly decreased with the variable s=3. This simulation has revealed that illuminance non-uniformity was reduced most effectively with the variable s=5. Thereafter, increasing the variable s lowered gradually the effect of reducing illuminance non-uniformity. This is possibly because, according to the foregoing equation (1), the shift amount P is gradually decreased with a rise in the variation s, and positional relationships between the laser lights become closer to the state with no shift (as shown in FIG. 3A).

SIMULATION EXAMPLE 2

Figures 7A, 7B:
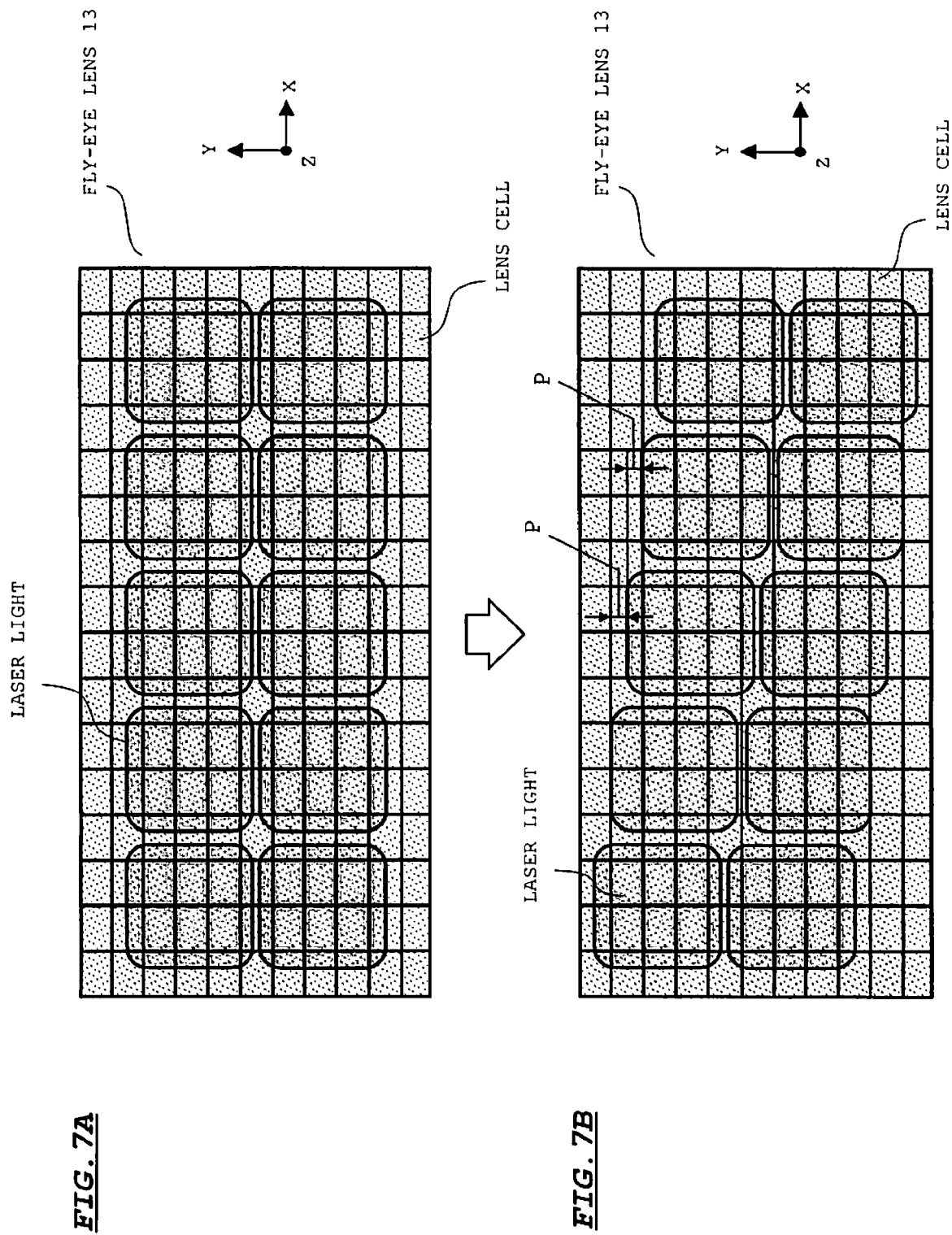
FIGS. 7A and 7B are diagrams showing a condition for the simulation example 2 in the embodiment.

This simulation was carried out with ten pairs of the laser light sources 11 and the cylindrical lenses 12. These pairs of the laser light sources 11 and the cylindrical lenses 12 were divided into two rows of five pairs each, and the pairs in each of the rows were linearly aligned as shown in FIG. 6A, so that the incident state of laser light on the fly-eye lens 13 became as shown in FIG. 7A. Under this condition, the laser light sources 11 and the cylindrical lenses 12 in the pairs were shifted in order from the end in the Y-axis direction as shown in FIG. 6B, to thereby change the incident state of laser light on the fly-eye lens 13 as shown in FIG. 7B. Then, illuminance non-uniformity in illumination light with the shift of the laser light was determined by the use of an optical simulation software program. A basic configuration of the optical system is the same as that shown in FIG. 1A.

A configuration of incident regions of laser light and the fly-eye lens 13 in this simulation are the same as that in the simulation example 1 (refer to FIGS. 4A and 4B). The shift amount P of laser light source 11 was set on the basis of the foregoing equation (1). Further, divergent angles θx and θy of laser light in the X-axis and Y-axis directions were θx=20° and θx=80°.

Figure 8:
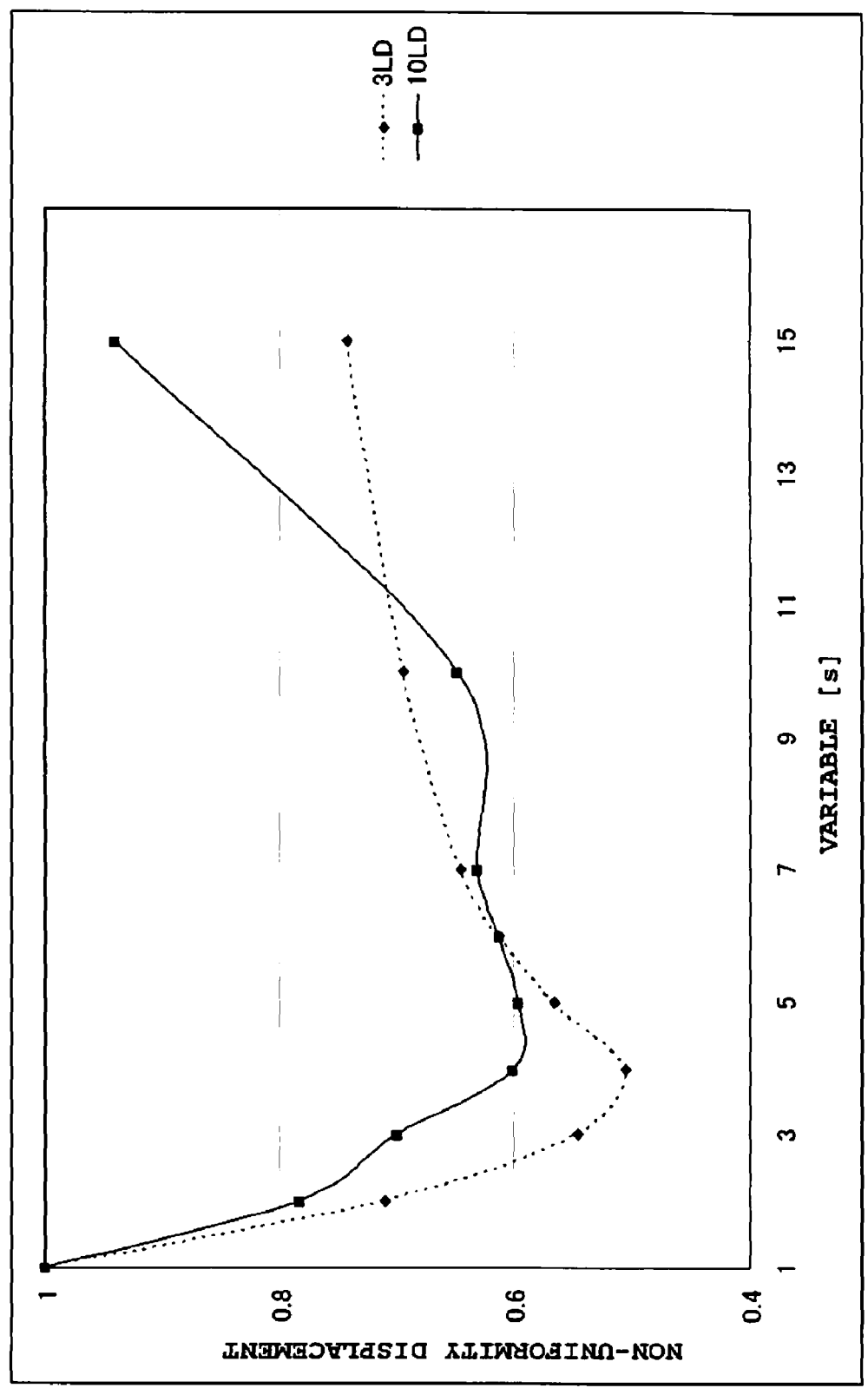
FIG. 8 is a graph showing results of the simulation example 2 and a simulation example 3 in the embodiment.

FIG. 8 shows a simulation result. In the graph, the result of this simulation example is provided by a solid line. As in the case with the foregoing example, the horizontal axis represents the variable s, and the vertical axis represents a displacement amount of non-uniformity.

Referring to the simulation result, it is understood that illuminance non-uniformity (displacement amount of non-uniformity) was decreased even with the variable s=2, as compared with the result of the simulation example 1 (FIG. 5). It is also found out that illuminance non-uniformity was substantially reduced with the variable s=4 or 5. This simulation has revealed that illuminance non-uniformity was decreased most effectively with the variable s=5. Thereafter, increasing the variable s lowered gradually the effect of reducing illuminance non-uniformity as in the case with the simulation example 1. This is possibly because the shift amount P is gradually decreased with a rise in the variation s, and positional relationships between the laser light sources 11 become closer to the state with no shift (as shown in FIG. 7A), as in the case with the simulation example 1.

SIMULATION EXAMPLE 3

Figures 9A, 9B:
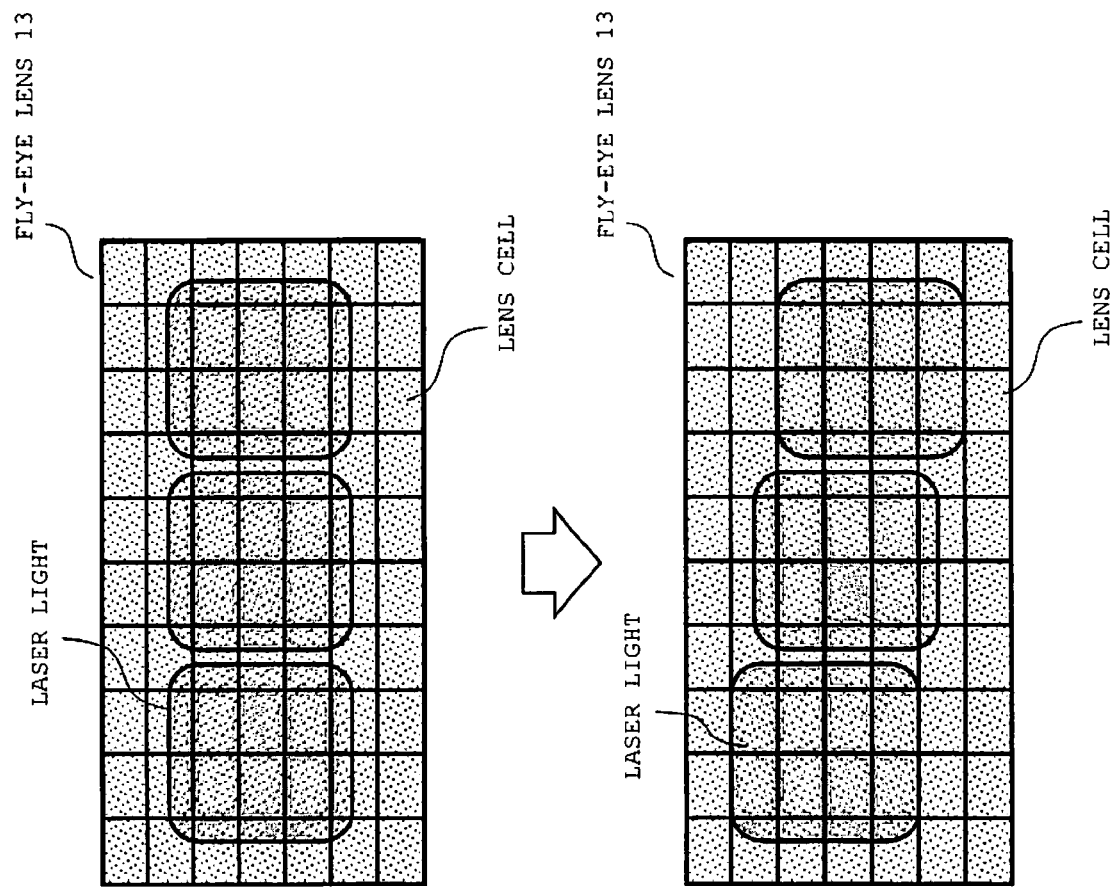
FIGS. 9A and 9B are diagrams showing a condition for the simulation example 3 in the embodiment.

In this simulation, three pairs of the laser light sources 11 and the cylindrical lenses 12 were arranged in a row as shown in FIG. 1B (b-1). Under this condition, as in the case with the simulation example 1, the laser light sources 11 and the cylindrical lenses 12 in the pairs were shifted in order from the end, to thereby change the incident state of laser light on the fly-eye lens 13 as shown in FIGS. 9A and 9B. Then, illuminance non-uniformity in illumination light with the shift of the laser light was determined by the use of an optical simulation software program. A basic configuration of the optical system was the same as that shown in FIG. 1A.

A configuration of incident regions of laser light and the fly-eye lens 13 in this simulation is the same as that in the simulation example 1 (refer to FIGS. 4A and 4B). The shift amount P of laser light source 11 was set on the basis of the foregoing equation (1). Further, divergent angles θx and θy of laser light in the X-axis and Y-axis directions are θx=20° and θx=80°.

FIG. 8 shows a result of this simulation by a dashed line. Referring to the simulation result, it is understood that illuminance non-uniformity (displacement amount of non-uniformity) were decreased with the variable s=2, as referred to the simulation result. In addition, it is found out that illuminance non-uniformity was substantially reduced with the variable s=3, 4 or 5. This simulation has revealed that illuminance non-uniformity was decreased most effectively with the variable s=4. Thereafter, increasing the variable s lowered gradually the effect of reducing illuminance non-uniformity, as in the cases with the simulation examples 1 and 2.

In the foregoing simulation examples, illuminance non-uniformity was measured by displacement amount of non-uniformity. However, the same tendencies as shown in FIGS. 5 and 8 were observed when illuminance non-uniformity was measured by an average deviation in illumination (average deviation=a standard deviation in illumination on a liquid crystal panel/an average illuminance in the overall region of the liquid crystal panel).

SIMULATION EXAMPLE 4

Figure 10B:
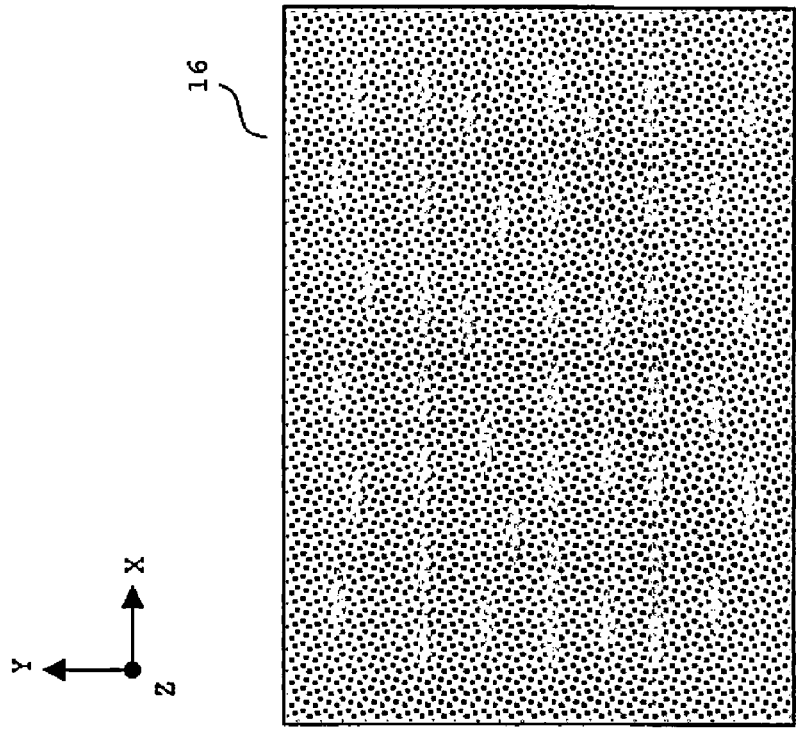
FIGS. 10A and 10B are diagrams showing a result of a simulation example 4 in the embodiment.
Figure 10A:
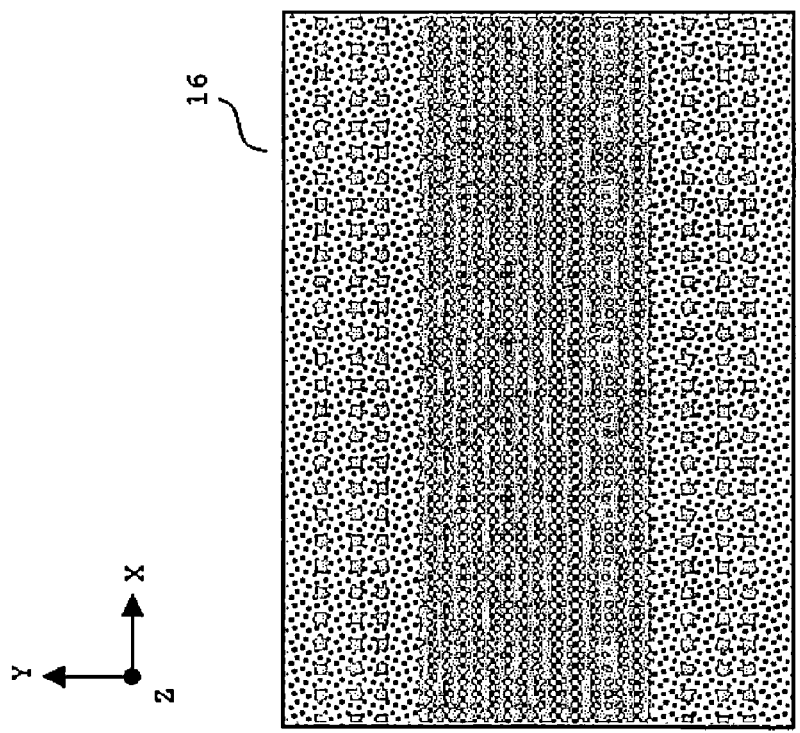

FIGS. 10A and 10B show schematically in monochromatic expression illuminance non-uniformity generated on the liquid crystal panel 16 when the variable s defining the shift amount P of laser light is set as s=1 (equivalent to the state with no shift) and s=5, respectively, in the foregoing simulation example 2 (where ten laser light sources are arranged in two dimensions), the illuminance non-uniformity being determined by the use of an optical simulation software program. In the FIGS. 10A and 10B, the illuminance is higher with increasing proximity to white.

When making a comparison between FIGS. 10A and 10B, it is recognized that a low-illuminance belt-like zone is generated in a central area in the Y-axis direction with the variable s=1 (equivalent to the state with no shift), whereas the belt-like zone is eliminated with the variable s=5. In addition, the illuminance is uniformized on the whole with the variable s=5, though there is a scatter of high-illuminance parts. As stated above, it is understood that, with the variable s=5, illuminance non-uniformity is substantially reduced on the liquid crystal panel 16, as compared to the case with the variable s=1 (equivalent to the state with no shift).

As foregoing, according to this embodiment, the effect of the fly-eye lens 13 in uniformizing illumination light can be significantly improved by arranging the laser light sources 11 so as to be mutually shifted in the Y-axis direction. Accordingly, it is possible to suppress effectively unevenness of a projected image resulting from illuminance non-uniformity in illumination light.

Figure 11B:
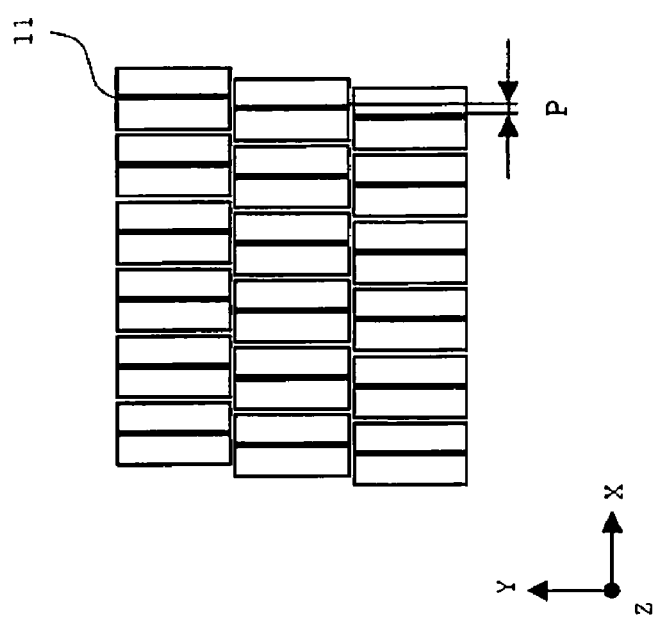
FIG. 11 is a diagram illustrating a modification example of the embodiment.
Figure 11A:
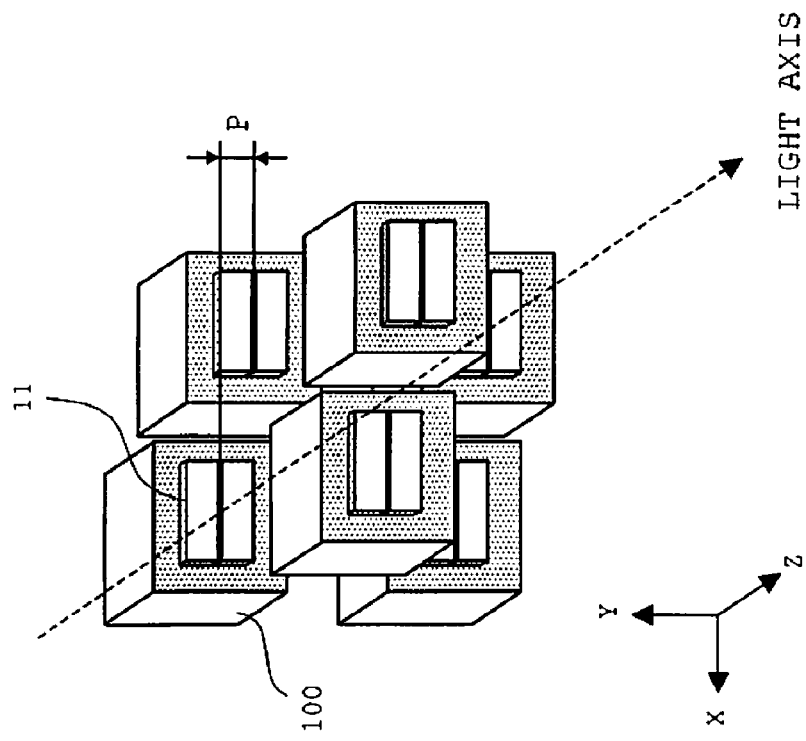

Although FIGS. 6A and 6B are used in this simulation example to describe the cases where a plurality of laser light sources 11 are placed in two dimensions, the same effect as shown in FIGS. 6A and 6B can be achieved by arranging the laser light sources 11 as shown in FIG. 11A. In this case, the cylindrical lenses 12 are disposed so as to converge and convert laser light into parallel light in the X-axis direction.

In addition, the same effect as mentioned above can be obtained by arranging a plurality of laser light sources 11 in three dimensions as shown in FIG. 11B. In particular, it is advantageous to arrange the laser light sources 11 in three dimensions if cooling parts 100 (such as liquid cooling jackets, Peltier devices) for removing heat from the laser light sources 11 as shown in FIG. 11B are attached to the laser light sources 11.

If the cooling parts 100 are attached to the laser light sources 11, arranging the laser light sources 11 in two dimensions may lengthen a distance between laser light axes and thus increase an entire beam size of illumination light, depending on the size of the cooling part 100. In contrast, by arranging the laser light sources 11 in three dimensions as shown in FIG. 11B, adjacent laser light sources (including the cooling parts 100) can be partly overlapped in an in-plane direction of the X-Y plane, thereby shortening the distance between the laser light axes. Accordingly, it is possible to reduce the entire size of illumination light and suppress an Etendue value of illumination light by the size reduction.

As stated above, in the three-dimensional arrangement, adjacent laser light sources 11 are also disposed in the in-plane direction of the X-Y plane so as to be mutually shifted by the shift amount P in the Y-axis direction, as shown in FIG. 11B. In addition, in the three-dimensional arrangement, the laser light sources 11 may be disposed so that a direction of stacking agrees with the X-axis direction, as shown in FIG. 11A. Further, in the case of arranging the laser light sources 11 in a row as shown in FIGS. 1 and 2, each of the laser light sources may be disposed anteroposteriorly in the direction of the light axis (the Z-axis direction).

Figure 14A:
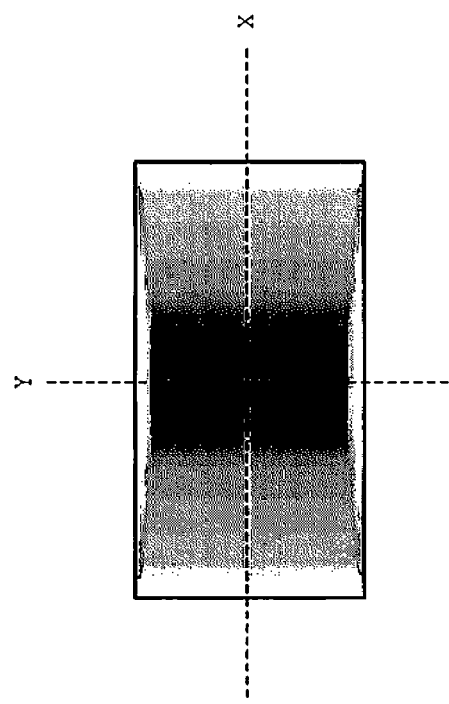
FIGS. 14A and 14C show configuration examples in which laser light emitted from a laser light source is converged and converted into parallel light by a cylindrical lens.
Figure 14B:
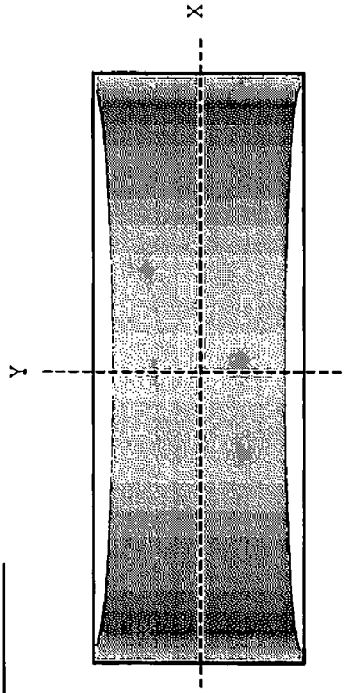
FIGS. 14B and 14D show intensity distributions of laser light which is converted into parallel light in the configurations shown in FIGS. 14A and 14C.
Figure 14C:
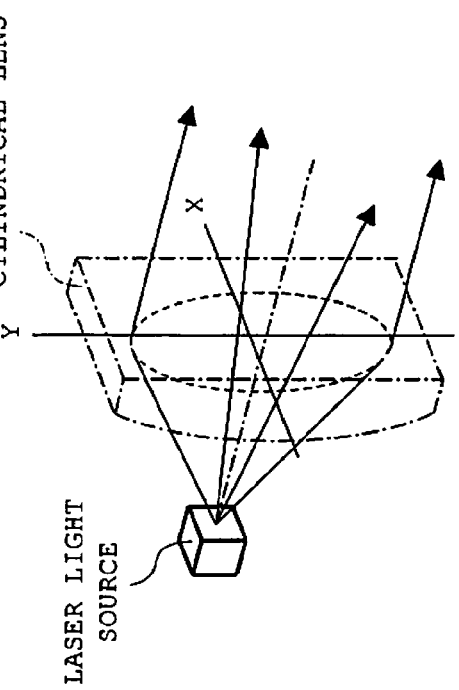
Figure 14D:
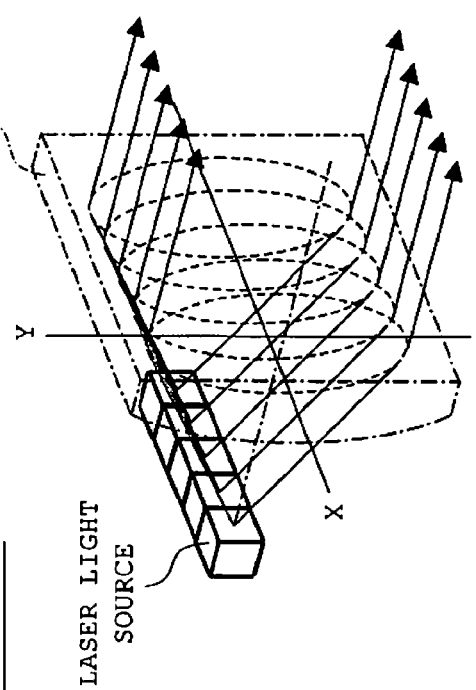

Non-uniformity in light intensity shown in FIGS. 14B and 14D become more prominent with an increasing distance between the laser light source 11 and the fly-eye lens 13. Accordingly, this embodiment becomes more effective with an increasing distance between the laser light source 11 and the fly-eye lens 13. For example, the effect of the foregoing simulation example is significantly pronounced when a distance between the laser light source and the fly-eye lens is 10 mm or more.

<Specific Exemplary Configuration of a Projector>

Figure 12:
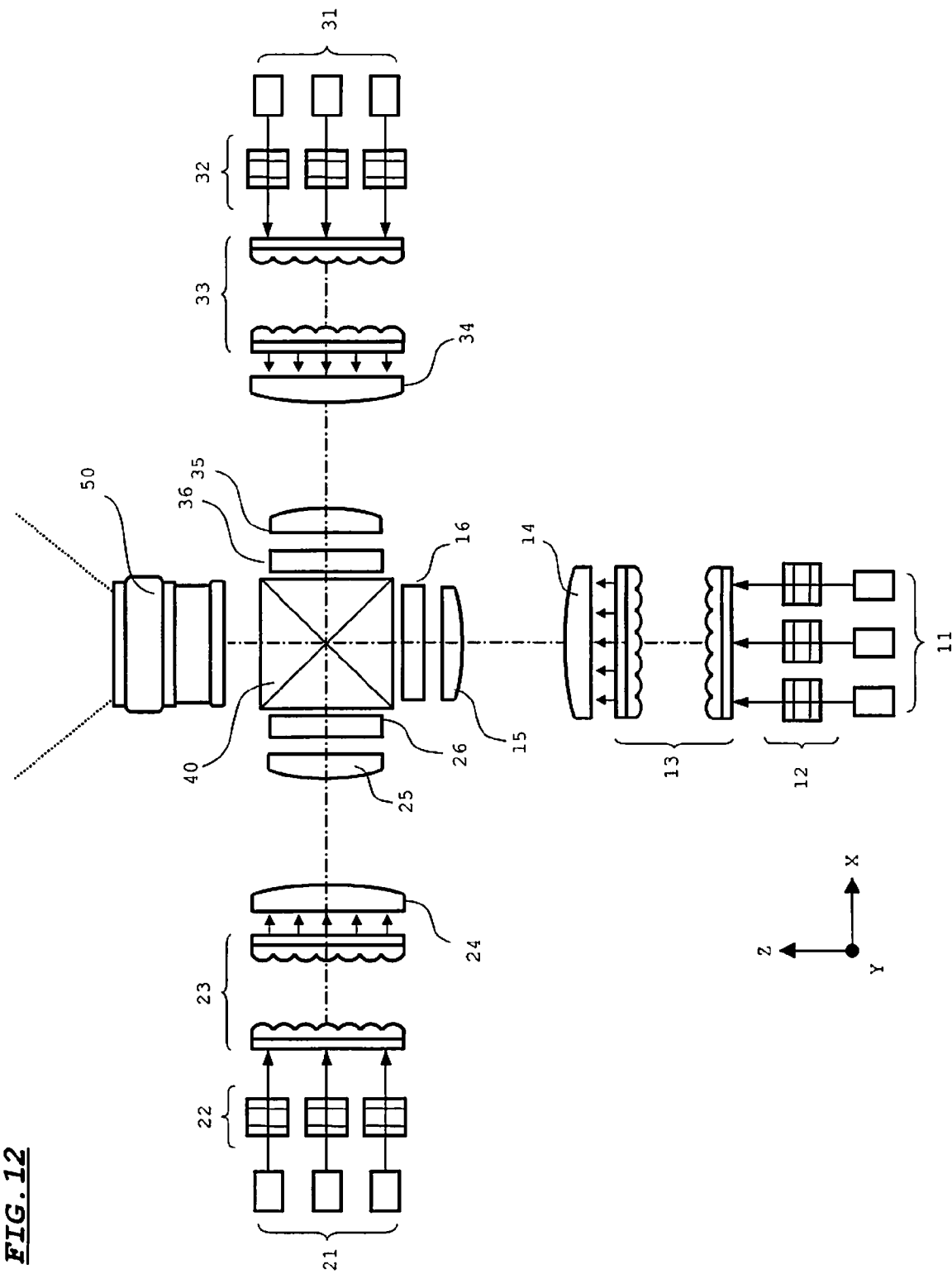
FIG. 12 shows a configuration example of a projector in which the embodiment appears in more specific form.

FIG. 12 illustrates a configuration example of a projector in which the foregoing embodiment appears in more detail.

In the diagram, an optical system covering from the laser light sources 11 to the liquid crystal panel 16 is the same as that in the basic configuration shown in FIG. 1. Here, the laser light sources 11 emit laser light with a green wavelength band (hereinafter referred to as "G light"). Although the diagram shows three laser light sources 11, the number of the laser light sources 11 are not limited to three and may be changed as necessary.

These laser light sources 11 are disposed so as to be mutually shifted, as described with regard to the foregoing embodiment. The laser light sources 11 may be arranged in a row as shown in FIGS. 1B and 2B, or in two or three dimensions as shown in FIG. 6B or 11B.

The G light emitted from the laser light sources 11 is converged and converted into parallel light in the Y-axis direction by the corresponding cylindrical lenses 12. The G light converted into parallel light is entered into a pair of fly-eye lenses 13. After passing through lens cells on the fly-eye lens 13, the G light goes through condenser lenses 14 and 15, and then is superimposed on an incident plane of the liquid crystal panel 16. Illuminance non-uniformity is suppressed in the superimposed G light, as described with regard to the foregoing embodiment.

An optical system covering from laser light sources 21 to a liquid crystal panel 26 is an optical system for laser light with a red wavelength band (hereinafter referred to as "R light"). A configuration of the optical system is the same as the basic configuration shown in FIG. 1.

The laser light sources 21 are disposed so as to be mutually shifted, as described with regard to the foregoing embodiment. The laser light source 21 may be arranged in a row, or in two or three dimensions. The laser light sources 21 emit R light such that a direction of a long axis of an emitted beam is parallel to the Y-axis direction.

The R light emitted from the laser light sources 21 is converged and converted into parallel light in the Y-axis direction by corresponding cylindrical lenses 22. The R light converted into parallel light is entered into a pair of fly-eye lenses 23. After passing through lens cells in the fly-eye lens 23, the R light goes through condenser lenses 24 and 25, and then is superimposed on an incident plane of the liquid crystal panel 26. Illuminance non-uniformity is suppressed in the superimposed R light, as described with regard to the foregoing embodiment.

An optical system covering from laser light sources 31 to a liquid crystal panel 36 is an optical system for laser light with a blue wavelength band (hereinafter referred to as "B light"). A configuration of the optical system is the same as the basic configuration shown in FIG. 1.

The laser light sources 31 are disposed so as to be mutually shifted, as described with regard to the foregoing embodiment. The laser light source 31 may be arranged in a row, or in two or three dimensions. The laser light sources 31 emit B light such that a direction of a long axis of an emitted beam is parallel to the Y-axis direction.

The B light emitted from the laser light sources 31 is converged and converted into parallel light in the Y-axis direction by corresponding cylindrical lenses 32. The B light converted into parallel light is entered into a pair of fly-eye lenses 33. After passing through lens cells in the fly-eye lens 33, the B light goes through condenser lenses 34 and 35, and then is superimposed on an incident plane of the liquid crystal panel 36. Illuminance non-uniformity is suppressed in the superimposed B light, as described with regard to the foregoing embodiment.

The G, R and B light is entered into the liquid crystal panels 16, 26 and 36, respectively, via an incident-side polarizer (not shown). The G, R and B light is modulated by the liquid crystal panels 16, 26 and 36, respectively, and then is entered into a dichroic prism 40 via an output-side polarizer (not shown).

The G, R and B light is combined at the dichroic prism 40, and the combined light is entered into a projection lens 50. The projection lens 50 includes: a group of lenses for forming an image with projection light on a projection plane; and an actuator for displacing some of the group of lenses in the direction of the light axis to adjust zoom and focus states of a projected image.

According to this configuration example, illuminance non-uniformity in illumination light is suppressed on the incident planes of the liquid crystal panels 16, 26 and 36, whereby it is possible to suppress an unevenness of a projected image.

As the foregoing, embodiments and a specific configuration example of a projector of the present invention are described. However, the present invention is not limited by these embodiments and configuration. Embodiments of the present invention may be modified in various manners other than the foregoing ones.

For example, in the foregoing embodiments, laser light is converged and converted into parallel light in the Y-axis direction by a cylindrical lens. Alternatively, laser light may be converged and converted into parallel light both in the Y-axis and X-axis directions by combining two cylindrical lenses as appropriate. In this case, non-uniformity in light intensity shown in FIG. 14B occur more prominently in a direction with a larger action of convergence, that is, in a direction of a long axis of a beam. Accordingly, it is here desired to suppress more prominent non-uniformity, and therefore it is preferred to shift the laser light sources in the direction of a long axis of a beam. In addition, laser light may be converted into parallel light both in the Y-axis and X-axis directions by combining two cylindrical lenses and a collimated lens as appropriate.

Further, a diffraction grating may be used to converge and convert laser light into parallel light in the Y-axis direction as shown in FIG. 12, for example. In this case, the diffraction grating may be of a slit type or a glazed type, for example. The diffraction grating has a diffraction pattern for converging and converting laser light into parallel light.

The configuration example shown in FIG. 12 includes the optical system covering from the laser light sources to the liquid crystal panel for each of G, R and B light. Alternatively, a common optical system covering from the laser light sources to the condenser lens may be provided directly behind the fly-eye lens such that the light path is separated later for G, R and B light by a dichroic mirror to guide G, R and B light to the corresponding liquid crystal panels.

In addition, the optical system may be configured in the LCoS system in which a reflective liquid crystal panel is used as an imager. More specifically, in the LCoS system, a reflective layer is provided for polarizing light on a surface layer of a liquid crystal, and the state of the reflective layer is electrically controlled to provide a video image on the liquid crystal panel. In this system, the laser light sources can also be arranged so as to be mutually shifted as described above to reduce illuminance non-uniformity in illumination light on the liquid crystal panel. Accordingly, it is possible to suppress unevenness of a projected image resulting from illuminance non-uniformity.

Figure 13A:
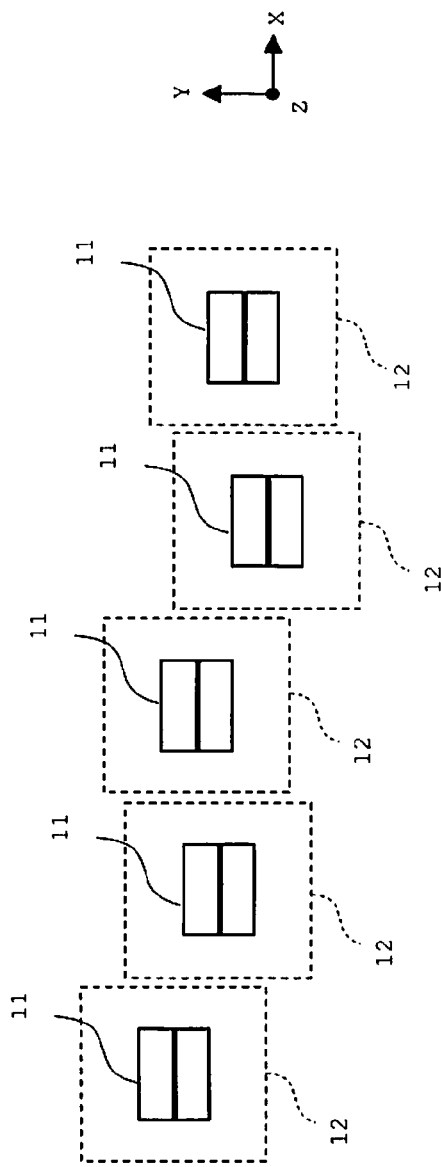
FIG. 13 is a diagram showing a modification example of the embodiment.
Figure 13B:
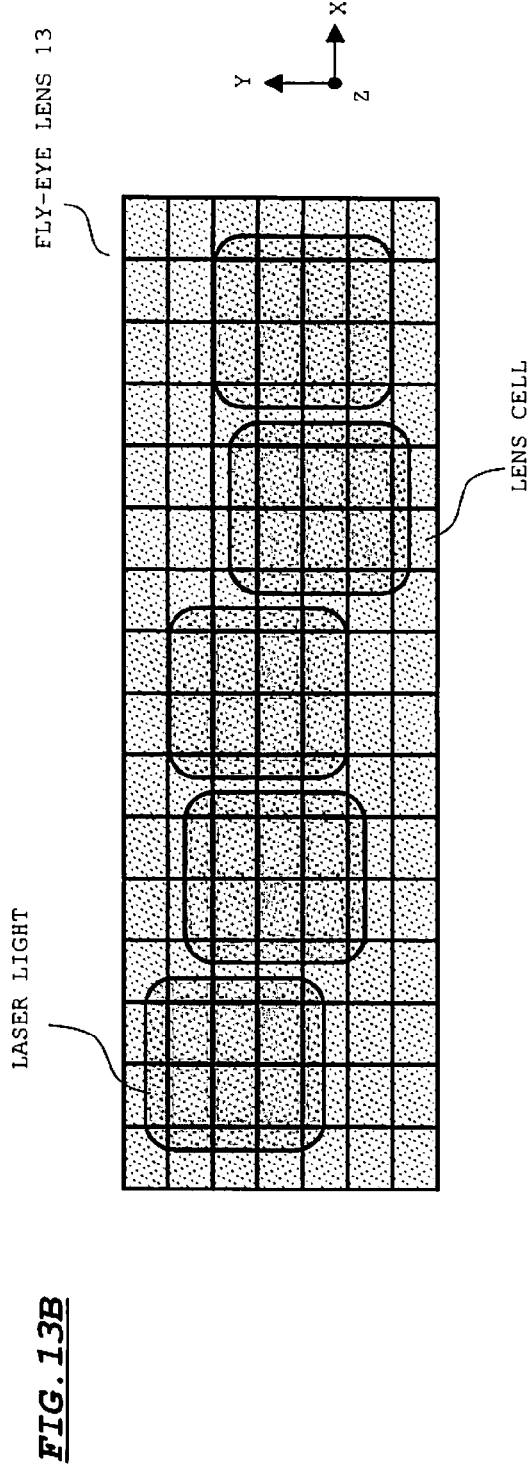

The laser light sources are not necessarily required to be shifted in a systematic manner. That is, the laser light sources 11 in FIG. 2B are shifted downward by one step from the left to right. Instead, the laser light sources 11 may be shifted at random as shown in FIG. 13A, for example, in which the second laser light source 11 from the left is shifted more downward than the third laser light source 11 from the left, whereby the third laser light source 11 from the left is in an intermediate position between the first and second laser light sources 11 from the left. In this case, the same effect as that described above can be expected. FIG. 13B is a diagram showing a state of application of laser light to the fly-eye lens 13 where the laser light sources are shifted as shown in FIG. 13A.

Although FIGS. 1 and 12 show cylindrical lenses provided individually to the laser light sources, an integrally formed cylindrical lens may be used instead. More specifically, one lens member with a plurality of lens parts may be disposed such that the lens parts correspond to emitting positions of the laser light sources. In this case, it is possible to achieve the same effect of uniformizing illumination light as stated above.

In addition, embodiments of the present invention can be modified as appropriate in various manners within the scope of a technical idea defined in the claim.

What is claimed is:

1. An illumination device comprising:

a plurality of laser light sources arranged so as to be identical in a direction of light emission;

an optical element for converting laser light having predetermined divergent angles emitted from the laser light sources into parallel light at least in one direction by providing a convergence action to the emitted laser light; and a fly-eye lens into which the laser light converted into parallel light is entered, wherein placement of the laser light sources is adjusted in such a manner that incident regions of the laser light on the fly-eye lens are mutually shifted in a row or column direction of lens cells disposed in the fly-eye lens.

2. The illumination device according to claim 1, wherein the plurality of laser light sources are arranged in two or three dimensions.

3. The illumination device according to claim 1, wherein the optical element comprises at least one cylindrical lens or diffraction element.

4. A projection display device comprising:

an illumination device for applying light to a region to be illuminated; and an imager disposed in the region to be illuminated, wherein the illumination device comprises:

a plurality of laser light sources arranged so as to be identical in a direction of light emission;

an optical element for converting laser light having predetermined divergent angles emitted from the laser light sources into parallel light at least in one direction by providing a convergence action to the emitted laser light; and a fly-eye lens into which the laser light converted into parallel light is entered, and wherein placement of the laser light sources is adjusted in such a manner that incident regions of the laser light on the fly-eye lens are mutually shifted in a row or column direction of lens cells disposed in the fly-eye lens.

5. The projection display device according to claim 4, wherein the plurality of laser light sources are arranged in two or three dimensions.

6. The projection display device according to claim 4, wherein the optical element comprises at least one cylindrical lens or diffraction element.

* * * * *